(12) United States Patent
Voglsinger

(10) Patent No.: US 7,647,818 B2
(45) Date of Patent: Jan. 19, 2010

(54) PROCESS FOR TESTING THE TIGHTNESS OF CONTAINERS

(75) Inventor: Martin Voglsinger, Assling (DE)

(73) Assignee: EADS Deutschland GmbH, Ottobrunn (DE)

( * ) Notice: Subject to any disclaimer, the term of this patent is extended or adjusted under 35 U.S.C. 154(b) by 464 days.

(21) Appl. No.: 11/291,932

(22) Filed: Dec. 2, 2005

(65) Prior Publication Data

US 2006/0117837 A1    Jun. 8, 2006

(30) Foreign Application Priority Data

Dec. 3, 2004 (DE) .................. 10 2004 058 606

(51) Int. Cl.
*G01M 3/04* (2006.01)
(52) U.S. Cl. .......................... 73/40.7; 73/40
(58) Field of Classification Search .............. 73/40, 73/40.7, 45.5, 49.2, 49.3, 52
See application file for complete search history.

(56) References Cited

U.S. PATENT DOCUMENTS 4,462,249 A * 7/1984 Adams .................. 73/40.5 A
5,566,877 A * 10/1996 McCormack ............ 228/105
6,597,973 B1 * 7/2003 Barich et al. .............. 701/29

FOREIGN PATENT DOCUMENTS

| DE | G 84 36 583.8 | 6/1985 |
| DE | 196 00 472 A1 | 7/1997 |
| DE | 196 30 709 A1 | 2/1998 |
| EP | 0 754 938 A1 | 1/1997 |
| GB | 1 474 469 | 5/1977 |
| JP | 57040628 A * | 3/1982 |
| JP | 57 110932 A | 7/1982 |

* cited by examiner

*Primary Examiner*—Hezron Williams
*Assistant Examiner*—Mark Shabman
(74) *Attorney, Agent, or Firm*—Crowell & Moring LLP

(57) ABSTRACT

A process for testing the tightness of containers includes making available a first fluid in the container interior space that is different from a second fluid surrounding the container, creating a negative pressure in the container interior space, testing the interior surfaces of the container side wall for traces of second fluid penetration, and possibly localizing any entry points.

7 Claims, 3 Drawing Sheets

PROCESS FOR TESTING THE TIGHTNESS OF CONTAINERS

BACKGROUND AND SUMMARY OF THE INVENTION

This application claims the priority of German Application 10 2004 058 606.3, filed Dec. 3, 2004, the disclosure of which is expressly incorporated by reference herein.

This invention is concerned with a process for testing the tightness of a container. Additionally, the invention provides for a process for sealing a container after a test of its tightness has been made, as well as a device for sealing the container.

The lack of tightness of fuel tanks and other containers in aircraft is a problem with far reaching effects on flight safety and operational safety on the ground. This problem also affects work safety and environmental protection. If aircraft fuel tanks are lacking in tightness, substantial repair costs can result, and the operational readiness of an aircraft fleet could be impaired. During a delivery of a new or overhauled aircraft to a customer, all systems are given a final testing. Tightnesses of the tank installations are also tested. During the operation of the aircraft on the ground, as well as during air operations, leaks may occur over the aircraft life-cycle, typically more than 25 years. The leaks may be the result of mechanical damage of the tank walls due to improper handling of the aircraft or due to unplanned stresses caused by flight operations such as overloads or vibrations. In military aircraft especially, such leaks may occur when the aircraft is being fired upon.

It is in the interest of an airline operator to restore flight worthiness of the aircraft at as little expense in time and personnel as possible without having the aircraft spend time in the repair hangar of the manufacturer. Especially in integral tanks, that is to say tanks which are fitted in their spatial design to the external contour of the aircraft and/or to the internal contour of the aircraft, the tank inner walls have multiple joint locations at which leakages can occur, even though the state of the art of sealing technology is very high both with respect to manufacture and testing quality.

In spite of all the measures taken, leaks that must be located and sealed can spring up in the tank walls during operation of an aircraft.

It is one object this invention to provide a process for testing the tightnesses of containers which can be carried out without a great expense even when the containers have complex internal and/or external contours, such as, for example, in the case of integral aircraft tanks, and to permit rapid determination of leak locations. Furthermore, it must be possible to seal leaks quickly and without great cost.

Testing for leakage of a container according to the invention includes separating a first fluid in an interior space of the container from a second fluid surrounding the container, producing a negative pressure in the interior space, testing interior surfaces of container walls for traces of second fluid penetration, and localizing any points of entry of the second fluid.

According to the invention, a partial vacuum is created in the tank and subsequently tested to determine whether a fluid has penetrated the internal space of the container. This makes it possible to locate in a simple way the exact entry point of the fluid entering the inner space of the container. This reversal of the principle, known as such, of creating high pressure in the interior space of a container and observing at which point fluid exits the container, avoids disadvantages of this known solution, since the fluid escaping from the container frequently is not visible at its point of exit but rather at some distance from it.

The localization of the entry point can also be observed through a window provided in the container, and it can be observed, from the outside, where the second fluid enters the interior space of the container. Nevertheless, it is especially advantageous when a probe is or several probes are brought into the interior space of the container. Such probes can be designed so as to be stationary within the internal container space or movable along the container internal wall.

Advantageous additional improvements are additionally provided.

After completion of the process of testing the containers for leakage, that is to say, after the localization of the entry point, a sealing compound can be applied with the help of a probe from the inside of the container at the point of leakage. This probe can be either independent of the camera or a combined probe which, in addition to the camera and, as the case may be, a gas supply, can also include at least one suitable repair tool such as, for example, an injector or an extruder for the sealing compound.

A device according to the invention for testing for container leakage and for repair of leaks allows for a fast repair immediately after identification of a leakage point.

BRIEF DESCRIPTION OF THE DRAWINGS

An example of the invention will be explained in greater detail with reference to the drawings.

DETAILED DESCRIPTION OF THE INVENTION

Figure 1:
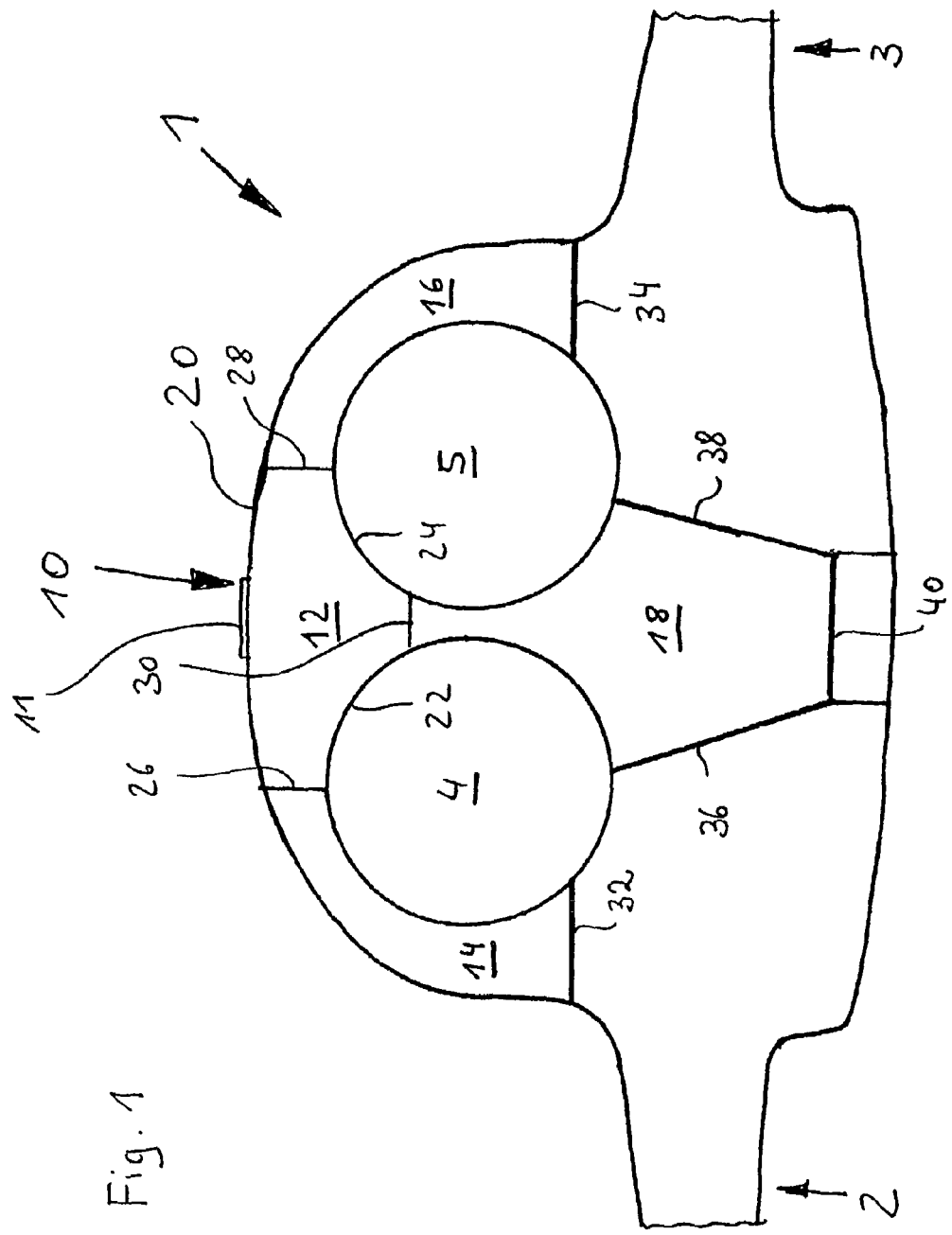
FIG. 1 shows a cross-section of an integrated aircraft tank.

FIG. 1 is a schematic view of a cross-section of a jet aircraft fuselage 1. The wings 2 and 3, of which only the wing roots are shown, are attached sideways in the lower area of the fuselage 1. As shown in the upper internal section of the fuselage 1, two air conduction channels 4 and 5 through which ram air is conducted to the engines are provided.

An integrated tank 10, which has several chambers, is shown within the fuselage. The chambers include an upper chamber 12, a left chamber 14, a right chamber 16, and a lower chamber 18. The fluid in the chambers can either be cross-connected or they each can have a separate refueling opening.

The upper chamber 12 of the integral tank 10 is limited by (not shown here) front and rear face walls, a section of the fuselage external skin 20, a section of the wall 22 of the left air conduction channel 4, a section of the wall 24 of the right air conduction channel 5, a left upper vertical bulkhead wall 26, a right upper vertical bulkhead wall 28, and a middle horizontal bulkhead wall 30.

The left chamber 14 of the integrated tank 10 is limited by a section of the fuselage external skin 20, a section of the wall 22 of the left air conduction channel 4, the upper left vertical bulkhead wall 26, as well as a left horizontal bulkhead wall 32 and the (not shown here) front and rear face walls.

The right chamber 16 of the integrated tank 10 is limited by a section of the fuselage external skin 20, a section of the wall 24 of the right air conduction channel 5, the upper right vertical bulkhead wall 28, as well as a right horizontal bulkhead wall 34 and the (not shown here) front and rear face walls.

The lower chamber 18 of the integrated tank 10 is limited by the middle horizontal bulkhead wall 30, a section of the wall 22 of the left air conduction channel 4, a section of the wall 24 of the right air conduction channel 5, a lower left bulkhead wall 36, a lower right bulkhead wall 38, as well as a lower horizontal bulkhead wall 40 and (not shown here) front and rear face walls.

The interior of the integrated tanks is accessible through a tank lid 11 lockable in or over an opening in the fuselage external skin 20.

Figure 2:
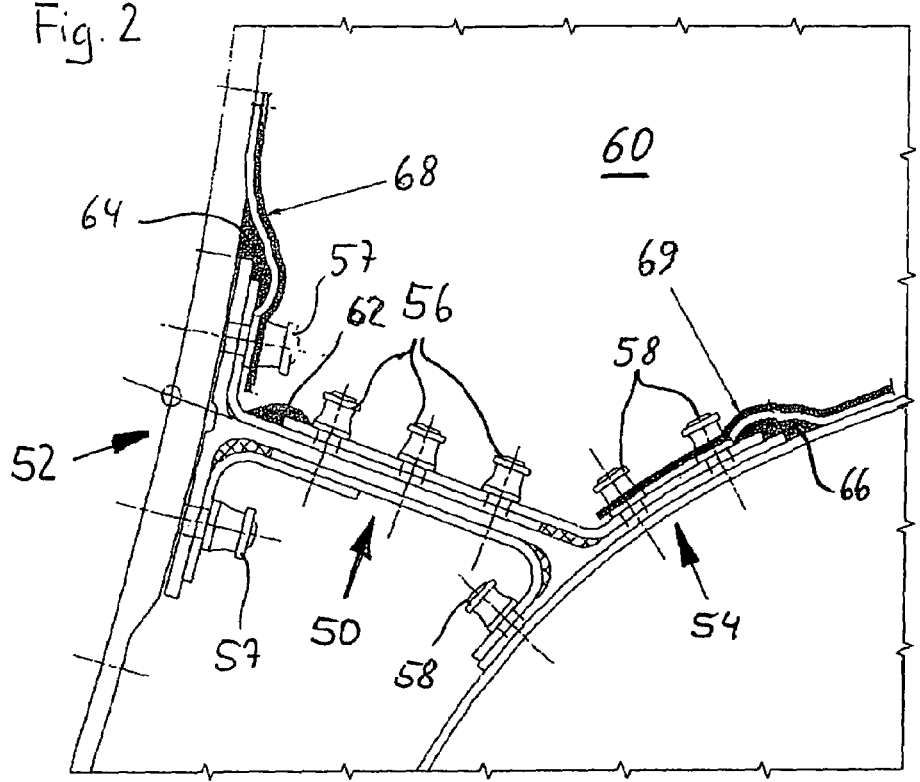
FIG. 2 is a cross-sectional representation of an integrated tank showing locations of the joints.

Corresponding sealing measures must be undertaken in order to seal reliably the integrated tank 10 everywhere the previously mentioned bulkhead walls or face walls push against the fuselage skin 20 and each of the walls 22 and 24 of the air conduction channels 4 and 5. FIG. 2 shows an example of such attachment of a bulkhead wall 50 on the corresponding side walls 52 and 54.

The bulkhead wall 50 is composed of multiple types of profiles or profile sections, which are fastened together by rivets 56. One of these profile sections is fastened by rivets 57 to the left wall 52, and others of these profile sections are fastened with rivets 58 to the right wall 54. Shown above the bulkhead wall 50 and between the left side wall 52 and the right side wall 54 is a chamber 60 of the integrated tanks. The individual profile sections of the bulkhead wall 50 are sealed together with a track sealant 62 on the side facing the chamber 60. In the area in which the profile sections of the bulkhead wall 50 are secured to the left side wall 52, a track sealant 64 is provided on the side of the chamber 60. Similarly, in the area in which the profile sections of the bulkhead 50 are secured to the right side wall 54, a track sealant 66 is also provided on the side of the chamber 60.

Spray sealants 68 and 69 overlying the securing area are additionally provided on the side of the chamber 60 of the integrated tanks where the bulkhead 50 is pushed against the left side wall 52 and against the right side wall 54.

Figure 3:
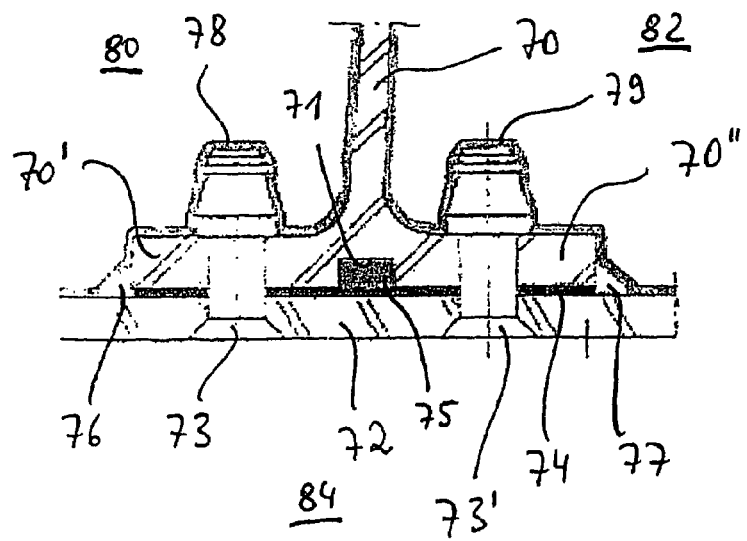
FIG. 3 shows sealing of an integrated tank at a joint location.

The mounting and sealing of one bulkhead wall against another wall is represented in FIG. 3.

A bulkhead wall 70, which has a cross-section in the form of an "I," pushes with its bottom surface against the interior surface of a side wall 72. The lower section of the bulkhead 70 has a left horizontal leg 70' and a right horizontal leg 70". A surface seal 74 is disposed between the bottom surface of the left horizontal leg 70' and the bottom surface of the right horizontal leg 70" of the bulkhead wall 70 as well as the interior surface of the side wall 72. The surface seal 74, for example, may consist of a polytetrafluoroethylene.

In its lower area at the side facing the side wall 72, the bulkhead wall 70 is provided with a groove 71 at a location where the left horizontal leg 70' and the right horizontal leg 70" push against each other. The groove 71 is also filled with sealant 75.

The bulkhead wall 70 and the side wall 72 are connected by rivets 73, 73', which also penetrate the side wall 72, the left horizontal leg 70', and the right horizontal leg 70".

Track sealants 76 and 77 are preferably provided, on the free rims of the left horizontal legs 70' as well as the right horizontal leg 70", between the legs 70', 70" and the side wall 72.

The entire connection arrangement between the bulkhead wall 70 and the side wall 72 described above is additionally sealed on each side of the bulkhead wall 70 by sealant coatings 78 and 79 which, at the least, overlap a surface section of the bulkhead wall 70, the interior head of the respective rivets 73, 73', each of the track sealants 76, 77, and at least one area of the internal side wall 72.

In this way, a seal with three barriers between the bulkhead wall 70 and the side wall 72 is achieved. This sealing of the joint locations provides for reliable sealing of the interior spaces 80 and 82 from the external surroundings 84.

During manufacture, each of these barriers is individually tested, during the assembly of the structure, in order to find any leaks as early as during the formation process. Here a differentiation is made between the dry tests in which gaseous test substances are used and the wet tests which take place with liquids such as, for example, water, fuel, or fuel substitute liquids. Customarily, these tests are carried out using high pressure in the tank space while simultaneously looking for leakage. In the process according to this invention, however, the interior space of the container or integral tank 10 is put under pressure lower than the prevalent pressure of the external environment. This causes leakage, in contrast to a process according to the state of the art, to proceed in the reverse direction along a track which terminates at the source of leakage, and thus the point of entry. Using this process, leakage can be both reliably located and perfectly pinpointed.

When a tank has a simple geometry, a transparent tank cover can be used in order to observe and locate the entry of the leakage through the transparent tank lid. When a more complicated tank geometry with especially difficult access to individual chambers of a tank or, as in the example of FIG. 1, an integral tank is present, it is preferable to insert controllable camera probes through the special sealable openings provided for such purpose in the tank covers of the individual chambers.

Figure 4:
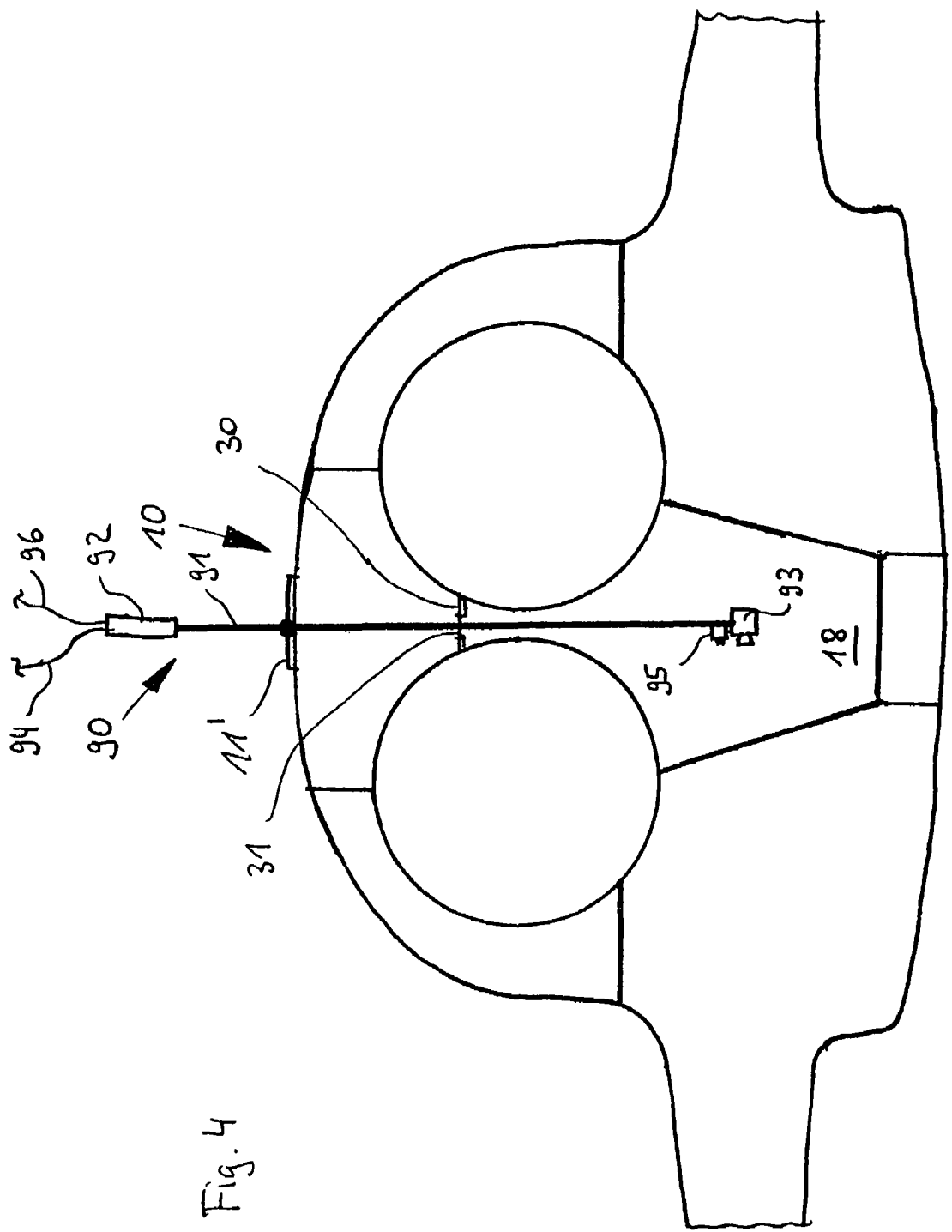
FIG. 4 shows inspection of an integrated tank with a camera probe.

FIG. 4 shows an example of such a camera probe inserted into an integral tank.

The tank cover 11 of FIG. 1 has been replaced in the example of FIG. 4 by a tank cover 11'. A swiveling and axially adjustable probe 90 can be guided through a guiding tube 91 into the integral tank 10. The guiding tube 91 is provided at its external end with a handle 92, with the help of which the guiding tube 91 swivels about the transition point through the tank cover 11' and can then be axially shifted. The guiding tube 91 is inserted through an opening 31 in the middle horizontal bulkhead wall 30 into the lower chamber 18 of the integrated tank 10. A camera head 93 is provided at the lower end of the guiding tube 91, which is linked by outside controlled optical or electrical wiring 94 through the guiding tube 91 to an image reproduction device (not shown here).

In addition to the camera head 93, a device 95, such as a spray nozzle, for emission of a sealant is located at the end of the guiding tube 91. This device is also linked by a tube 96 extending through the conducting tube 91 outside to a feed line (not shown here) for a sealing compound. Sealant can be transported through the tube 96 into the nozzle 95 and then delivered under pressure through the nozzle 95.

In place of a camera head 93, or in addition thereto, a different type of sensor, for example a gas sensor, can also be used. This makes it possible to detect and recognize a point of entry of a gas entering into the chamber 18 of the integrated tank 10 from the outside.

With the shown probe 90, it is possible to test the interior of a container, especially the shown integral tank 10, for leakage when the container interior space is under lower pressure than the surrounding environment. It is thus possible to locate and identify the points of leakage and, using the nozzle 95, to bring up sealing compound from the inside to the corresponding points of leakage of the chamber 18 and thus seal off and eliminate the leakage. If necessary, lighting (not shown here)

can Also be planned to be added to the camera head 93. As a probe 90, for example, a conventional commercial borescope can be used.

The invention is not limited to the aforementioned examples, which have only been used for a general description of the invention. Within the scope of legal protection, a device according to this invention can take on other than the above-described forms. In this connection, the device can also include features which constitute a combination of the individual characteristics of the claims.

The reference characters in the claims and the drawings serve only for better understanding of the invention and are not to be considered to limit the scope of protection.

I claim:

1. A process for testing tightness of a tank comprising:
    separating a first fluid in an interior space of the tank from a second fluid that differs from the first fluid surrounding the tank,
    producing a negative pressure in the interior space,
    inserting at least one probe, including a camera, into the interior space,
    testing interior surfaces of tank walls for traces of second fluid penetration by said at least one probe,
    localizing any points of entry of the second fluid,
    reproducing an image taken by the camera on a monitor, and
    superimposing the image on a virtual representation of a tank interior wall in order to localize any point of entry on the virtual representation.

2. The process according to claim 1, wherein the first fluid is liquid, the second fluid is gaseous, and the testing is optical testing which takes place by detection of gas bubbles in the liquid.

3. The process according to claim 1, wherein the first fluid is a first gas or gas compound, the second fluid is a second gas or gas compound that is different from the first gas or gas compound, and the testing takes place by detection of the second gas or gas compound.

4. The process according to claim 1, wherein the probe comprises a gas sensor.

5. The process according to claim 1, wherein, after localization of any of said points of entry of said fluid, sealant material is applied from the interior space of the tank to each point of entry by said probe.

6. The process according to claim 1, wherein the tank is an integral tank of a vehicle.

7. The process according to claim 6, wherein the vehicle is an aircraft or a space vehicle.

* * * * *

UNITED STATES PATENT AND TRADEMARK OFFICE
CERTIFICATE OF CORRECTION

PATENT NO.       : 7,647,818 B2
APPLICATION NO.  : 11/291932
DATED            : January 19, 2010
INVENTOR(S)      : Martin Voglsinger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 669 days.

Signed and Sealed this

Twenty-eighth Day of December, 2010

David J. Kappos
*Director of the United States Patent and Trademark Office*